Feb. 22, 1949.  C. V. FUQUA  2,462,314
TREE-FELLING CIRCULAR SAW
Filed Sept. 2, 1944  4 Sheets-Sheet 1

INVENTOR:
Clarence V. Fuqua.
BY Fishburn & Mullendore
ATTORNEYS.

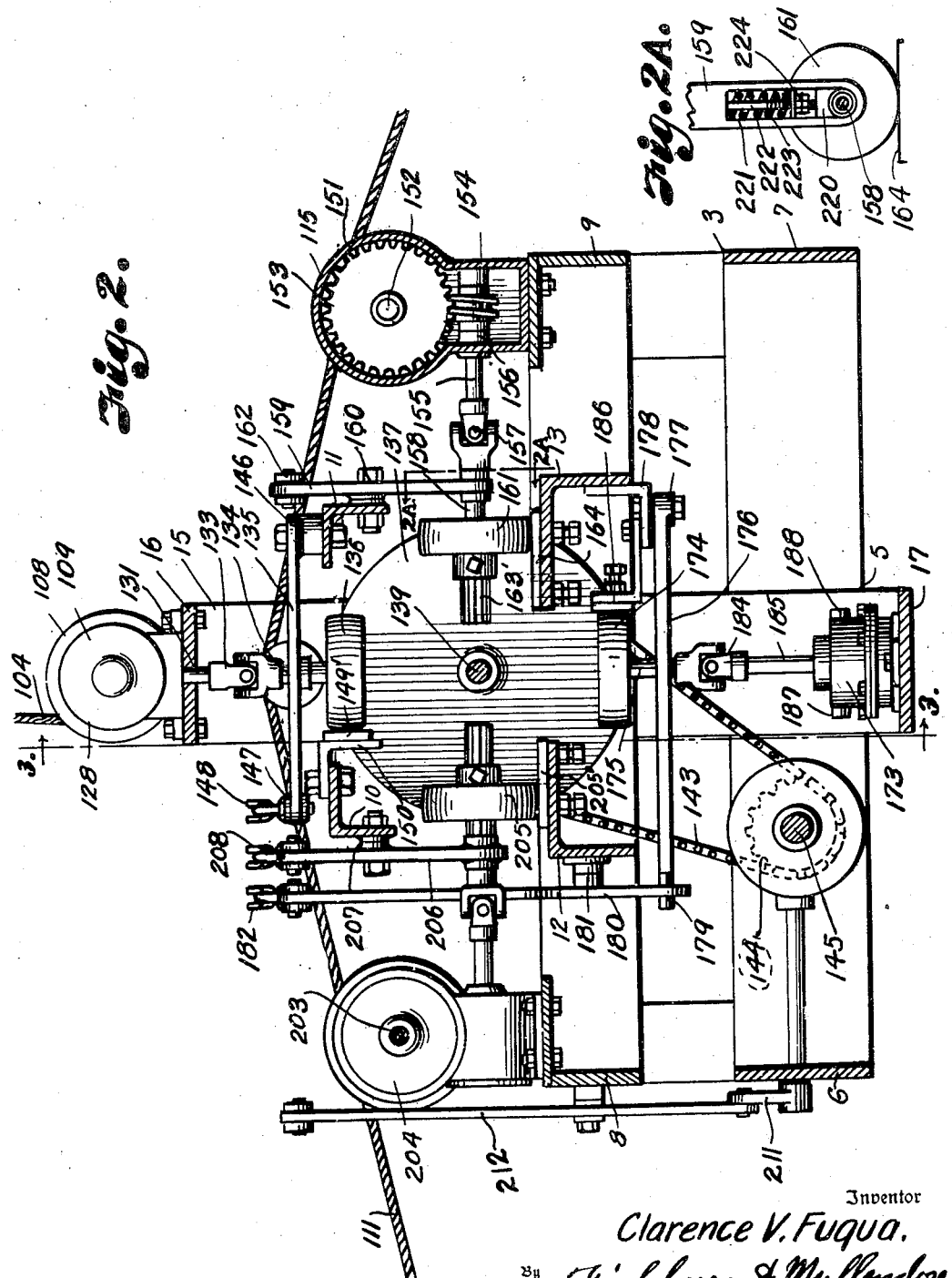

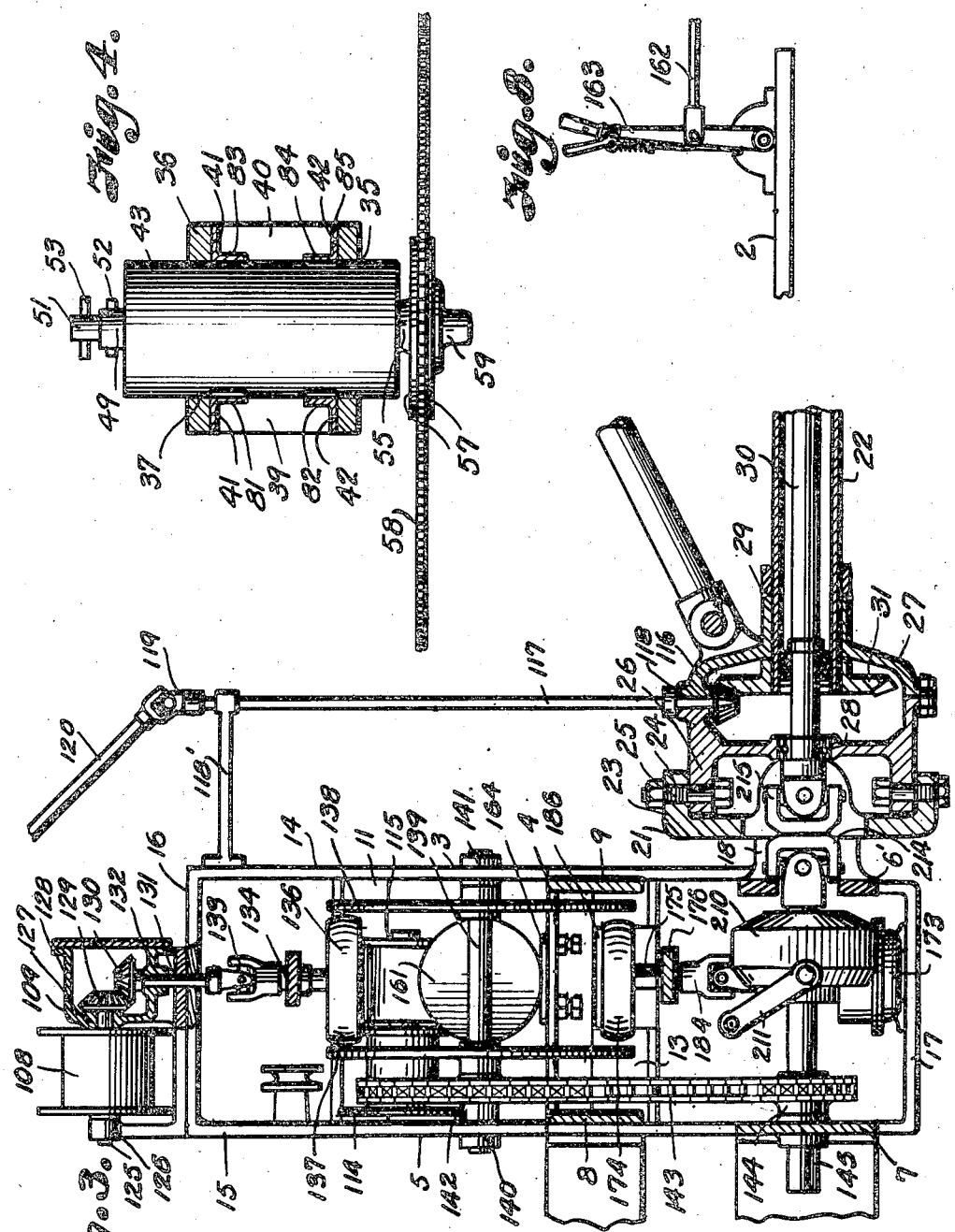

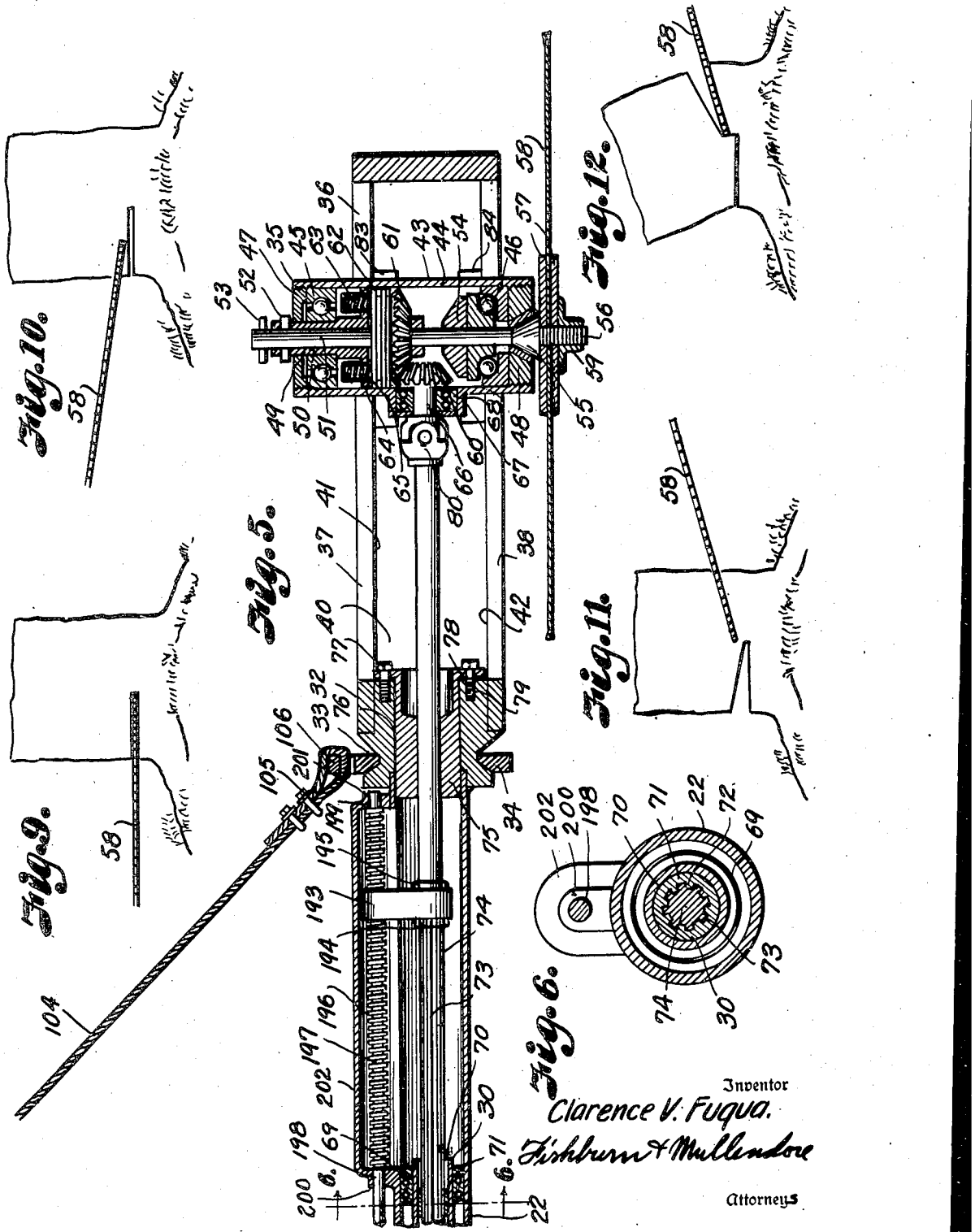

Patented Feb. 22, 1949

2,462,314

UNITED STATES PATENT OFFICE 2,462,314

TREE-FELLING CIRCULAR SAW

Clarence V. Fuqua, Vandalia, Ill.

Application September 2, 1944, Serial No. 552,518

7 Claims. (Cl. 143—43)

This invention relates to a self-propelled, power-driven sawing apparatus particularly adapted for clearing land of trees, brush and the like. Heretofore it has been necessary to clear land by hand methods and such procedure is not practical for clearing large and usually inaccessible areas such as swamps, jungles and irregular terrains.

Therefore, the principal object of the present invention is to provide a machine for economically and rapidly clearing such lands for agricultural purposes.

Further objects of the invention are to provide a vegetation-clearing machine adapted for use by the armed forces in rapidly clearing ways through jungles, swamps, and irregular terrains without disturbing the ground; to provide a machine construction adapted to various sizes for cutting small brush as well as the largest trees; to provide a portable machine with a saw that can be readily maneuvered and placed in different angles for cutting up trees cut down by the machine; to provide a machine whereby large timber may be quickly and safely cut with the minimum number of operations, thereby reducing the cost of cutting timber for lumber and like wood products; and to provide a machine with means for pushing over trees cut by the saw to assure falling thereof in the desired direction.

Further objects of the invention are to provide a saw mounting whereby the saw may be swung from side to side progressively with movement of the machine to cut a swath; and to provide means for raising and lowering the saw to conform to the terrain being cut over.

In accomplishing these and other objects of the invention, I have provided improved structure, the preferred form of which is illustrated in the accompanying drawing wherein:

Fig. 1 is a perspective view of a machine constructed in accordance with the present invention and showing the saw in position for making the initial cut at the base of a tree.

Fig. 2 is a cross section through the power control units for maneuvering the saw to cut at various positions and angles.

Fig. 2a is a sectional view on the line 2a—2a of Fig. 2 particularly illustrating mounting of the friction wheels on their operating levers.

Fig. 3 is a section on the line 3—3 of Fig. 2.

Fig. 4 is a cross section through the saw-mounting head.

Fig. 5 is a longitudinal section through the saw-mounting head.

Fig. 6 is a detailed cross section on the line 6—6 of Fig. 5.

Fig. 7 is a diagrammatic view of the operating pump, piping, and hydraulic jack used in pushing over and controlling the fall of trees and the like.

Fig. 8 is a side elevational view of one of the control levers of the machine.

Fig. 9 is a diagrammatic view showing the position of the saw in making the first cut through the base of a tree to be felled.

Fig. 10 is a similar view showing the position of the saw for making the second cut to produce a notch in the side of the tree.

Fig. 11 is a similar view showing the position of the saw for producing the final cut.

Fig. 12 is a similar view showing the cut tree falling to the ground.

Figures 1, 7:
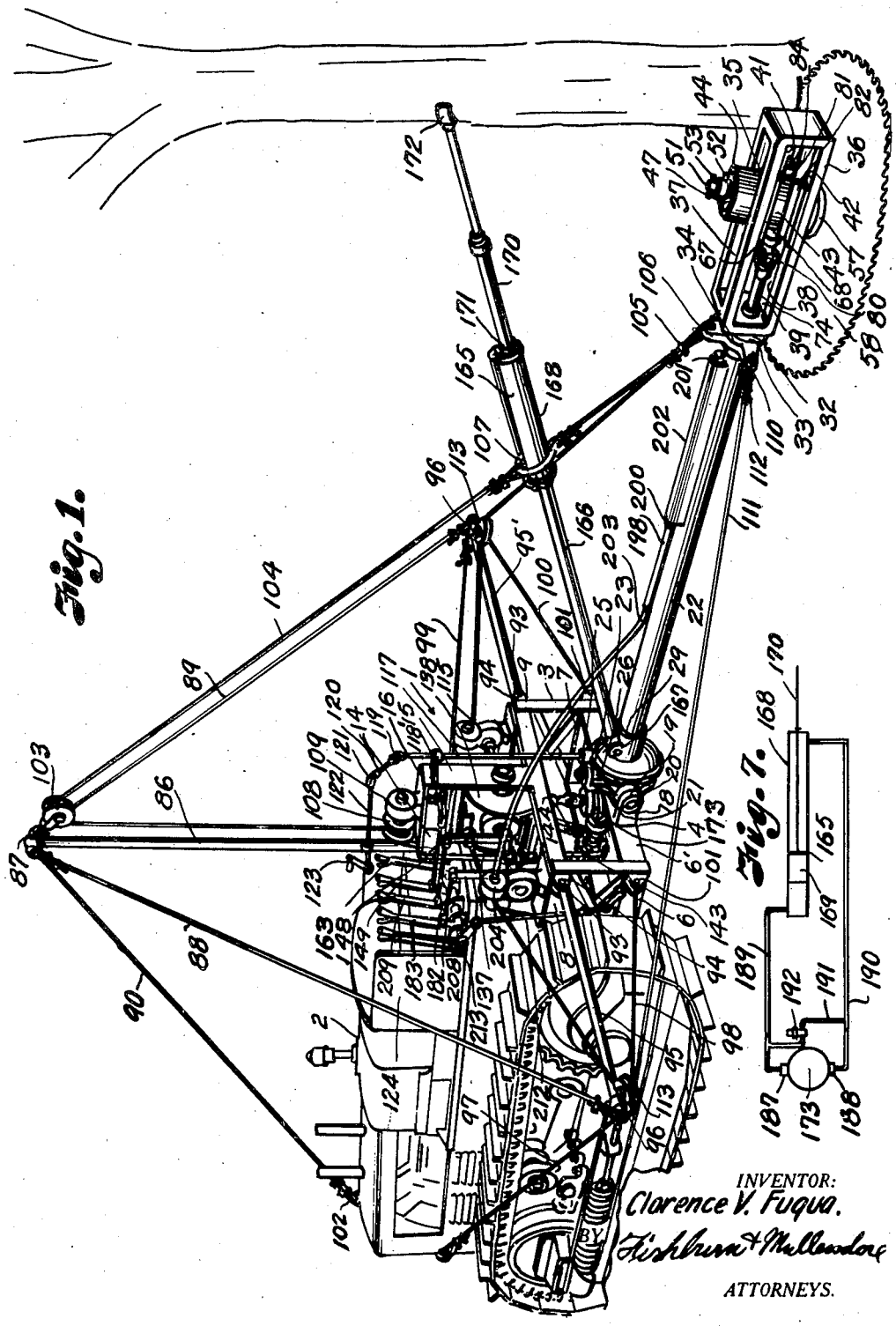

Referring more in detail to the drawings:

I designates a machine constructed in accordance with the present invention and which includes a self-propelled vehicle such as a truck or tractor of any suitable type; for example, a caterpillar tractor 2 which adapts the machine for movement over irregular terrains, swamp lands, and like places where wheeled vehicles are not operable; however, it is to be understood that the invention is adapted to wheeled vehicles when the terrain permits.

Mounted on the tractor 2, preferably at one end thereof, is a frame 3 including spaced front and back members 4 and 5 connected by longitudinal base rails 6—7, upper rails 8—9, and angles 10—11 and 12—13 as best shown in Fig. 2. The front and rear members also include vertical uprights 14 and 15 connected at their upper ends by a cross bar 16 and at their lower ends by a similar cross bar 17.

Projecting from the lower rail 6' of the front frame member 5 are spaced arms 18 carrying bearings 19 for mounting trunnions 20 of a spider or universal member 21 whereon the spider member is adapted to pivot on a horizontal axis to raise and lower a boom 22. The member 21 has vertically aligning arms 23 carrying bearings 24 which mount pivot members 25 that connect the spaced arms 23 with similar spaced arms 26 on a gear housing 27 later described. See Fig. 3.

The gear housing 27 carries the rear end of the boom and has spaced bearings 29 and 28 to respectively journal the boom 22 and an inner power shaft 30. The journalled end of the boom projects sufficiently into the housing to mount a beveled gear 31 by which it is adapted to be turned as later described. The opposite end of tho boom carries a head 32 having a groove 33 circumferentially thereof for mounting a collar 34 in which the head 31 is adapted to turn for positioning a saw unit 35 carried thereby. See Fig. 5.

The head 32 includes a frame having longitudinal bars 36 spaced apart to provide upper and lower slots 37 and 38 and lateral ways 39 and 40 providing facing surfaces 41 and 42 to mount the saw unit slidably therein as now to be described.

The saw unit includes a substantially cylindrical gear housing 43 positioned in the head 32 with ends thereof projecting through the slots 37 and 38 as best shown in Fig. 5. The housing 43 has a cylindrical wall 44 supporting an upper anti-friction bearing 45 and a lower combination rotary and thrust bearing 46, which bearings are retained in position by threaded plates 47 and 48 closing the respective ends of the housing. Rotatably journalled in the upper bearing is a drive sleeve 49 which has an axial bore 50 passing a shaft 51, the shaft 51 being connected thereto by a shear pin 52 extending through projecting ends of the drive sleeve and shaft as shown in Figs. 1, 4, and 5, so that the drive sleeve is coupled with the shaft but is adapted to be disconnected upon shearing of the pin 52 should excessive loads be applied to the shaft. Should the pin 52 shear, the shaft and saw carried thereby is supported by a pin 53 extending through an end of the shaft that projects beyond the upper end of the sleeve but which is adapted to engage the end of the sleeve. The lower end of the shaft carries a collar 54 supported on the bearing 46 and which collar cooperates with a tapered portion 55 on the shaft to support the shaft against longitudinal movement in the gear housing. The tapered portion 55 of the shaft is rotatably mounted in a tapered bearing of the plate that closes the lower end of the housing.

Formed on the shaft below the tapered portion 55 is a threaded extension 56 mounting clamping washers 57 on the respective sides of a disk saw 58, the saw being retained against the base of the tapered portion by a flanged nut 59. Freely journalled on the shaft directly below the drive sleeve and supported in co-operative relation with a drive pinion 60 is a beveled gear 61 which is connected with the drive sleeve by a clutch 62. The clutch 62 includes a plurality of friction plates that are normally retained in frictional contact and in driving relation with the gear 61 by springs 63 carried by a flange 64 on the drive sleeve and which have one of their ends bearing against the upper friction plate and their opposite ends against the bottom of the spring housings 65 that are anchored to the flange of the drive sleeve. The driving pinion is fixed to a stub shaft 66 rotatably mounted in an anti-friction bearing 67 supported within a lateral extension 68 of the gear housing on the side thereof facing the shaft 30. The shaft 30 terminates within the boom 22 at a distance from the head 32 substantially corresponding to the length of the travel of the saw unit and is rotatably supported by an anti-friction bearing 69 interposed between the terminal end of the shaft and the boom 22. The terminal end of the shaft 30 has an axial bore 70 and mounted therein near the open end thereof is a collar 71 having a plurality of splines 72 thereon engaged with splines 73 on a telescoping extension 74. See Fig. 6. The extension 74 is slidably and rotatably supported within a bearing 75 positioned within a bore 76 formed in the head 32 and which is retained in the bore by suitable fastening devices such as cap screws 77 that project through openings in a flange 78 of the bearing and into threaded sockets 79 of the head as best shown in Fig. 5. The splined portion of the shaft is of sufficient length to accommodate the desired travel of the saw unit and has the forward end thereof connected with the stub shaft 66 by a universal joint 80 to compensate for any misalignment of the respective shafts.

It is obvious that when the shaft 30 is rotated the pinion 60 is rotated to drive the gear 61, which in turn drives the sleeve 49 through the clutch 62 and the sleeve 49 drives the saw shaft 51 through the shear pin 52 to effect rotation of the saw.

It is also apparent that the saw unit may be reciprocated within the ways of the head during rotation of the saw, the driving connection between the shaft 30 and the extension 74 being maintained by the splined portion thereof engaging the splines of the internal collar 71. The gear housing of the saw unit is slidably supported on the ways of the head 32 by angles 81—82 and 83—84 suitably attached to opposite diametric sides thereof so that the flanges 85 thereof are located in sliding contact with the guide surfaces 41 and 42 as best shown in Fig. 4.

The boom 22 which supports the saw unit is adapted to be raised, lowered, and shifted laterally to either side of the longitudinal center line of the tractor under power as now to be described.

Pivotally supported on the frame 3 is a gin pole or mast 86 having a bracket 87 on the upper end thereof for connecting guy wires 88, 89, and 90. The sides of the frame 3 have brackets 92 and 93 carrying hinge pins 94 mounting laterally extending arms 95 and 95'. The outer ends of the arms carry brackets 96 to which are connected the lower ends of the guys 88 and 89 and stay wires 97 and 98 for the arm 95 and 99 and 100 for the arm 95', the stay wires 97 and 99 being attached to the forward end of the tractor and the wires 98 and 100 being attached to brackets 101 fixed to a lower portion of the frame 3 as best shown in Fig. 1. The guy 90 is connected to a suitable bracket 102 on the opposite end of the tractor so that the gin pole or mast is rigidly supported in a perpendicular position but which may be lowered to a reclining position upon loosening of the guy wires to permit passage thereof under trees, line wires, or the like when the machine is being transported from one site of operation to another.

Carried on the bracket at the upper end of the gin pole 86 is a pulley 103 for passing a cable 104 having one end connected as at 105 with an ear 106 on the collar 34. Interposed within the cable is a ring 107 for a purpose later described. After passing the pulley 103, the cable extends downwardly and is connected with a reel 108 of a windlass unit 109 that is mounted on the cross bar 16 so that when the windlass is operated the boom 22 is raised and lowered on the trunnions 20. See Fig. 3.

Extending laterally from the collar 33 are similar ears 110 for connecting the ends of a cable 111 as indicated at 112, which cable operates over pulleys 113 fixed to the outer ends of the lateral arms and connects with a reel 114 of a windlass unit 115 supported upon the cross member 9 of the frame 3 as best shown in Figs. 1 and 2, the cable being guided to the reel by suitable pulleys as required. It is obvious that when the reel winds the cable in one direction the boom 22 is shifted in the one direction, and when the reel winds the cable in the opposite direction the boom is shifted in the other direction.

It is also obvious that the saw may be tilted to any desired angle in any one of its adjusted positions by providing means for rotating the gear 31 that is attached to the rear end of the boom 22. This is effected by a pinion gear 116 meshing with the teeth of the gear 31, the pinion 116 being fixed to a flexible control shaft 117 that is rotatably mounted in a bearing 118 of the gear housing 27. The flexible shaft 117 extends upwardly and the opposite end is rotatably supported in a bracket 118' projecting forwardly of the upper portion of the frame 3 as shown in Figs. 1 and 3. The upper end is connected by a universal joint 119 with an angle shaft 120 which in turn is connected through a similar universal joint 121 with a rearwardly extending shaft 122, which is adapted to be rotated by a hand crank 123 that is located in position adjacent the driver's seat 124 of the tractor. Thus, by rotating the hand crank the boom 22 may be oscillated in either direction to move the saw blade from a level position to any angular position relative to the axis of the boom.

The windlass unit 109 is best shown in Fig. 3 and includes a shaft 125 mounting the reel 108, which shaft has one end supported in a bearing 126 and its opposite end in a bearing 127 of a gear case 128 formed as a part of the unit. Fixed to the shaft 125 within the gear case is a beveled pinion 129 meshing with the bevel gear 130 on a vertical shaft 131 which is rotatably mounted in a bearing 132 of the gear case. The shaft 131 projects downwardly through the cross bar 16 and connects through a universal joint 133 with a shaft 134. The shaft 134 is journalled in a lever arm 135 and carries a friction wheel 136 between spaced driving disks 137 and 138 as best shown in Figs. 2 and 3. The driving disks 137 and 138 are spaced apart on a shaft 139 having its ends journalled in bearings 140 and 141 carried by the front and rear members of the frame 3 as shown in Fig. 3.

The shaft 139 is actuated by a sprocket 142 which is connected by a chain 143 with a driving sprocket 144 on a shaft 145 that is connected in any suitable manner with the power take-off shaft of the tractor.

The friction wheel is of smaller diameter than the spacing between the disks so that it may have a neutral position midway between the disk or be caused to engage either one or the other of the disks to drive the reel in either direction. This movement of the wheel is effected by shifting the lever arm 135. In order to shift the arm 135, one end thereof is pivoted as at 146 on the cross bar 11 and the other end connects as at 147 with a link 148 which has its opposite end connected with an actuating lever 149 located adjacent the driver's seat 124. Thus, by shifting the lever 135 forwardly or backwardly from a central position the friction wheel may be moved into driving relation with either one of the driving disks to effect rotation thereof in either direction and rotation of the reel so as to wind on or pay out the cable 104 that supports the outer end of the boom 22. When the friction wheel is in neutral position midway between the driving disk it is in contact with a brake shoe 149' that is adjustably carried by an angle bracket 150 from the cross bar 10 as best shown in Fig. 2.

The windlass unit 115 is of similar construction and includes a gear case 151 supported on the cross bar 9 (Fig. 2). The case journals a shaft 152 and mounted thereon is a worm gear 153 meshing with a worm 154 on a lateral shaft 155 journalled in a bearing 156 of the gear case and which shaft connects through a universal joint 157 with a shaft 158 journalled in the end of a vertical lever 159 that is pivotally supported on the cross bar 10 as at 160. The shaft 158 carries a friction wheel 161 similar to the wheel 136 and which is adapted to engage either the drive disks by operation of the lever 159 through a link 162 with a hand lever 163 similar to the hand lever previously described.

The friction wheel 161 is preferably splined on its shaft as at 163' so that it is adapted to be adjusted to and from the axis of the driving disks to vary the driving speed thereof. When the friction wheel is in neutral position it is in engagement with a brake shoe 164 carried by the cross bar 13 as shown in Fig. 2.

In order to control falling of a tree and make certain the falling direction thereof, the boom-like arm carrying the saw unit may be provided with a hydraulic jack 165 which is supported in the ring 107, previously mentioned, and by an arm 166 pivoted to ears 167 on the gear housing, which ears are positioned so that the thrusts of the jack operate against the frame 3. The jack 165 includes a cylinder 168, and slidable in the cylinder is a piston 169 which carries a piston rod 170 extending through a suitable stuffing box 171 in the forward end of the cylinder and which carries a shoe or the like 172 adapted to engage against the side of a tree as shown in Fig. 1. The hydraulic jack is supplied with pressure fluid from a pump 173 carried by the lower cross bar of the frame 3 and which is driven by a friction wheel 174 similar to the friction wheels previously described. See Fig. 2. The wheel 174 is carried on a shaft 175 journalled in a rock lever 176 having one end pivoted as at 177 to a bracket 178 on the cross bar 13 and its other end pivotally connected as at 179 with a lever 180 pivotally mounted as at 181 to the cross bar 12. The upper end of the lever is connected through a link 182 with a hand lever 183 similar to the hand levers previously described. The shaft 175 connects through a universal joint 184 with the shaft 185 of the pump.

It is thus obvious that the pump may be rotated in either direction depending upon engagement of the friction wheel with one or the other of the driving disks. When in neutral position the friction wheel is retained from contact with the disk by a shoe 186 carried from the bracket 178 previously mentioned.

The pump has connections 187 and 188 with ducts 189 and 190 leading to the respective ends of the cylinder 168 as best shown in diagram in Fig. 7. The ducts 189 and 190 are interconnected with a bypass 191 having a pressure regulating valve 192 therein whereby fluid may be bypassed relative to the jack cylinder.

Since the pump may be rotated in either direction, it is obvious that the piston of the jack may be moved under hydraulic pressure in either direction to apply a shoving pressure on a tree or to retract the shoe of the jack rod.

In order that the saw may be reciprocated in the guide head when making a cut, the telescoping shaft extension 74 carries an arm 193 which is engaged between collars 194 and 195 on the shaft. See Fig. 5. The arm 193 has an internally threaded opening in the upper end thereof engaging the threads 196 of a screw shaft 197. The shaft 197 is mounted in parallel alignment with the shaft extension and has the ends 198 and 199 thereof journalled in suitable bearings 200 and 201 of a housing 202 which encloses a slot in top of the tubular boom through which the arm 193 projects as best shown in Fig. 5. In order to rotate the screw shaft the end 198 thereof extends rearwardly along the boom 22 and connects by flexible shaft 203 having its other end connected with the shaft of the driving unit 204 that is mounted on the cross bar 8. See Fig. 1. The driving unit 204 is of similar construction to the windlass units and is operated in a similar manner by a friction wheel 205 (Fig. 2) adapted to be engaged with one or the other of the driving disks and with a brake shoe 205' by a lever 206 that is pivotally supported as at 207 on the bracket 19 and has the operating end thereof connected by a link 208 with an operating lever 209 similar to the operating levers previously described.

In order that the friction disks may be operated independently of the saw, the driving shaft 145 is connected with the shaft 30 through a clutch indicated by the housing 210, the clutch 210 being operated by a rocker arm 211 that is connected by a link 212 with an operating lever 213 on the tractor.

In order to accommodate the movement of the boom, the shaft 30 is connected with the clutch by interconnected universal joints 214 and 215, the joint 215 being connected to the shaft 30 and the joint 214 with the driven shaft of the clutch. See Fig. 3.

The friction wheels 136, 161, 174, and 205 are preferably yieldingly supported by their operating levers as illustrated in Fig. 2a. The shafts carrying the wheels are mounted in suitable bearings slidable in slots 221 of the arms and which are engaged by shoes 220. The shoes 220 carry threaded rods 222 for supporting coil springs 223 mounted in the slots and having one end engaging the end of the slot opposite the shoes 220 and their opposite ends engaging a washer backed by jamb nuts 224 on the threaded rods 222. Thus, the springs yieldingly pass the wheels against the brake shoes 149', 164, 186, and 205' respectively to prevent rotation thereof and to support the boom and saw in adjusted position.

In using the machine constructed and described and assuming that the machine is to be used in cutting a swath through a thicket or the like, the tractor is operated in a direction to move the saw progressively forward in the direction of the saw. The hand lever 149 is moved forwardly or retractively to rock the lever 135 in a direction to cause the friction wheel 136 to engage one or the other of the disks 137 or 138 depending upon the direction required to bring the saw to a desired level relative to the ground over which the machine is caused to move. Since the power take-off of the vehicle is rotating the shaft 145, the sprocket 144 actuates the sprocket 142 through the chain 143 to rotate the driving disks 137 and 138 and the disk engaged by the wheel 136 will rotate the shaft 131 to drive the reel 108 through the pinions 129 and 130. Operation of the reel 108 will pay out the cable 111 or wind up the cable (depending upon direction of rotation) so that the saw is raised or lowered to a desired height relative to the ground.

The boom may be swung laterally from side to side so that the saw moves in an arc progressively with the movement of the tractor to cut a swath in the vegetation thereahead. This is accomplished by rocking the lever 163 first forwardly and then backwardly to bring the wheel 161 into and out of engagement with the respective driving disks 137 and 138 to operate the shafts 158 and 155 and thereby cause the worm 154 to rotate the worm gear 154' to rotate the gear 153. When the reel 114 is rotated in one direction, it is obvious that the cable 111 will be paid out at one side and wound up on the other to effect lateral swinging of the boom from side to side of the longitudinal center line of the tractor.

When the friction wheels 136 and 161 are caused to disengage with the one or the other of the driving disks, they immediately engage the brake shoes to retain the boom in any adjusted lateral or elevational position and the boom will remain in that position until one or the other of the friction wheels are again re-engaged with one of the friction disks. During swinging movement of the boom, the saw blade 58 is rotated by effecting engagement of the clutch 210. This is effected by the hand lever 213. On engagement of the clutch 210 the shaft 30 rotates to operate the pinion gear 60 which drives the gear 61 of the saw unit, which gear drives the sleeve 59 through the clutch plate 62 and the sleeve 59 rotates the saw shaft by reason of the connection through the shear pin 52. Should the saw meet with unusual resistance, the shear pin will break and disrupt the driving connection to prevent injury to the saw or other mechanism.

In cutting down a tree the clutch 210 is preferably disengaged to stop rotation of the saw and then the controls are operated to bring the saw into a substantially horizontal position and close to the ground to make the initial cut as shown in Fig. 9. When the saw is in proper alignment, the clutch 210 is engaged to start the saw. The saw unit is then moved forwardly on the ways of the carrying head so that the saw blade makes a substantially horizontal cut through one side of the tree. This is effected by operating the lever 183 to bring the friction wheel 205 into engagement with one of the driven wheels to effect rotation of the flexible shaft 203 in the desired direction. Rotation of the shaft 203 rotates the shaft 198 and screw shaft 197 to cause the arm 193 to move along the screw and thereby move the shaft extension 74 which pushes the saw assembly forwardly in the ways of the mounting head. When the cut has passed completely through one side of the trunk, the rotating movement of the screw shaft is reversed by rocking the hand lever 183 in the opposite direction to effect retractive movement of the arm 193 along the length of the screw shaft. However, before this movement is effected, the saw is raised and then tilted as shown in Fig. 10 so that the second cut is above the first cut and at an acute angle thereto. The saw unit is raised by operating the reel 108 in the proper direction through actuation of the control lever 163. Movement of the saw to an angular position is effected by operating the crank 123 which actuates the shafts 122, 120, 117, pinion gear 118 and beveled gear 131 to rotate the boom 22 in the collars 29 and 34. Since the forward end of the boom is connected with the splined shaft through the splined collar, the entire saw assembly will be tilted and when drawn retractively will produce a V-shaped cut in the tree as shown in Fig. 11. The tractor is then backed away from the tree and the reels 108 and 114 are caused to be operated to bring the teeth of the saw into position at the opposite side, the saw being elevated so that the cut will terminate above the termination of the previously formed V-shaped cut so as to provide an interengaged portion on the tree trunk and stump to prevent upending of the trunk when the tree falls, thereby prevent overshooting of the trunk relative to the stump of the tree and causing damage to the machine or operator thereof.

If it is desired to assist in falling the tree, or to apply pressure to avoid pinching of the saw, this may be effected by operating the hydraulic jack 168.

If a number of trees are to be cut in a thickly wooded terrain, the machine must be run retractively so that the trees do not fall in the way thereof and it will not be necessary to cause the machine to travel over the fallen trees.

The machine may also be utilized for cutting up the trees by bringing the boom into position over a fallen tree and rotating the carrying head of the saw unit to bring the saw to the proper angle relative to the trunk of the tree.

From the foregoing it is obvious that I have provided a machine which is especially adapted for clearing land of trees, brush, and the like in an inexpensive and rapid manner so that the clearing of large and inaccessible areas such as jungles, swamps, and the like is made practicable.

It is also obvious that the machine may be used for clearing roadways or paths through districts thickly covered with vegetation without interfering with the ground conditions such as the case when bulldozers or the like are used to push over trees and break down such vegetation.

What I claim and desire to secure by Letters Patent is:

1. A machine of the character described including a mobile support, a boom, movable means mounting the boom on the mobile support, a pair of friction driving disks rotatably mounted on the mobile support, a friction wheel, means supporting the friction wheel between the friction driving disks, means for moving the friction wheel to and from engagement with the respective driving disks, a brake shoe intermediate said disks and engageable by the friction wheel when said wheel is out of contact with said disks, a reel having connection with the friction wheel, a cable wound on the reel and having connection with the boom for moving the boom on said universal mounting means, a saw unit rotatably supported on the boom, and hydraulic means carried by the boom and cable adapted to engage objects cut by the saw for applying directional force to said objects.

2. A machine of the character described including a mobile support, a saw unit, a vertical mast having support on the mobile support, a boom on the mobile support, a head rotatably mounted on the boom having ways, means slidably mounting the saw unit in said ways in the head, a pulley on the mast, a reel on the mobile support, a cable connected with the boom and operating over the pulley for winding on said reel, means for operating the reel, and hydraulic means supported by the boom and mast adapted to engage objects to be cut by the saw for applying directional force to said objects.

3. In a machine of the character described including a mobile frame, a boom, universal means mounting the boom on the mobile frame, a mast, means pivotally mounting the mast on the mobile frame, stays normally retaining the mast in a fixed position on the mobile support, a pair of friction driving disks rotatably mounted on the mobile frame, friction wheels, means supporting the friction wheels between the friction driving disks, means individual to each friction wheel for selectively moving the friction wheels to and from engagement with the respective driving disks to operate the driving disks in opposite directions, reels having connection with the friction wheels, a pulley on the mast, a cable connected with the outer end of the boom and operating over the pulley to wind and unwind to and from one of said reels to adjustably support the boom, arms extending laterally from the mobile frame, pulleys on said arms, a cable wound upon the other of said reels and operating over the pulleys on said arms, means connecting the ends of the last named cable with the boom for effecting lateral swinging movement of the boom, and brake means engageable with said friction wheels when the friction wheels are out of contact with the friction disks.

4. In a machine of the character described including a mobile frame, a boom, universal means mounting the boom on the mobile frame, a vertical mast, means pivotally mounting the mast on the mobile frame, stays normally retaining the mast in a fixed position on the mobile support, a pair of friction driving disks rotatably mounted on the mobile frame, friction wheels, means supporting the friction wheels between the friction driving disks, means individual to each friction wheel for selectively moving the friction wheels to and from engagement with the respective driving disks to operate the driving disks in opposite directions, reels having connection with the friction wheels, a pulley on the vertical mast, a cable connected with the outer end of the boom and operating over the pulley to wind and unwind to and from one of said reels to adjustably support the boom, arms extending laterally from the mobile frame, pulleys on said arms, a cable wound upon the other of said reels and operating over the pulleys on said arms, means connecting the ends of the last named cable with the boom for effecting lateral swinging movement of the boom, a saw unit mounted on the boom, brake means engageable with said friction wheels when the friction wheels are out of contact with the friction disks, a shaft carried by the boom and having telescoping connection with the saw unit for rotating the saw of said unit, and means for moving the saw unit in the longitudinal direction of the boom.

5. In a machine of the character described including a mobile frame, a boom, universal means mounting the boom on the mobile frame, a vertical mast, means pivotally mounting the mast on the mobile frame, stays normally retaining the mast in a fixed position on the mobile support, a pair of friction driving disks rotatably mounted on the mobile frame, friction wheels, means supporting the friction wheels between the friction driving disks, means individual to each friction wheel for selectively moving the friction wheels to and from engagement with the respective driving disks to operate the driving disks in opposite directions, reels having connection with the friction wheels, a pulley on the mast, a cable connected with the outer end of the boom and operating over the pulley to wind and unwind to and from one of said reels to adjustably support the boom, arms extending laterally from the mobile support, pulleys on said arms, a cable wound upon the other of said reels and operating over the pulleys on said arms, means connecting the ends of the last named cable with the boom for effecting lateral swinging movement of the boom, a saw unit mounted on the boom, brake means engageable with said friction wheels when the friction wheels are out of contact with the friction disks, a shaft carried by the boom and having telescoping connection with the saw unit for rotating the saw of said unit, means for moving the saw unit in the longitudinal direction of the boom, and means at the respective ends of the boom for rotating the boom to position the cutting angle of the saw unit.

6. A machine of the character described including a mobile support, a boom, universal means mounting the boom on the mobile support, a saw unit rotatably carried on the boom, a drive shaft on the mobile support, an operating shaft supported by the boom and connected with the saw unit, windlass means on the mobile frame for lateral swinging of the boom on the mobile support, a driving connection between the windlass means and the drive shaft, a hydraulic jack carried by the boom adapted to engage objects to be cut for applying directional force to said objects, and a clutch connecting the drive shaft with the operating shaft whereby the saw unit is operated independently of the windlass means.

7. A machine of the character described including a mobile support, a boom, universal means mounting the boom on the mobile support, a saw unit rotatably carried on the boom, a drive shaft on the mobile support, an operating shaft supported by the boom and connected with the saw unit, windlass means on the mobile frame for lateral swinging of the boom on the mobile support, a driving connection between the windlass means and the drive shaft, a hydraulic jack carried by the boom adapted to engage objects to be cut for applying directional force to said objects, a clutch connecting the drive shaft with the operating shaft whereby the saw unit is operated independently of the windlass means, means for moving the saw unit longitudinally of the boom, and means for changing the cutting angle of the saw of said unit relatively to the mobile support and about the axis of the boom.

CLARENCE V. FUQUA.

REFERENCES CITED

The following references are of record in the file of this patent:

UNITED STATES PATENTS

| Number | Name | Date |
| --- | --- | --- |
| 676,197 | Mill | June 11, 1901 |
| 751,878 | Spangler | Feb. 9, 1904 |
| 807,176 | King | Dec. 12, 1905 |
| 824,129 | Mason | June 25, 1906 |
| 1,039,338 | Wallace | Sept. 24, 1912 |
| 1,318,324 | Keon | Oct. 7, 1919 |
| 1,414,319 | Zaiuskis | Apr. 25, 1922 |
| 1,447,606 | Seymour | Mar. 6, 1923 |
| 1,602,357 | Georgelis | Oct. 5, 1926 |
| 2,105,030 | Dunham | Jan. 11, 1938 |
| 2,312,287 | Renner | Feb. 23, 1943 |
| 2,354,625 | Van Sickle | July 25, 1944 |
| 2,365,408 | Hillyer | Dec. 19, 1944 |